(12) United States Patent
Larsen et al.

(10) Patent No.: US 8,121,734 B2
(45) Date of Patent: Feb. 21, 2012

(54) METHOD AND SYSTEM FOR CONTROLLING THE CLIMATE IN A HOUSE

(75) Inventors: Lars Finn Sloth Larsen, Sydals (DK); Honglian Thybo, Soenderborg (DK); Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 654 days.

(21) Appl. No.: 12/278,010

(22) PCT Filed: Feb. 8, 2007

(86) PCT No.: PCT/DK2007/000059
§ 371 (c)(1),
(2), (4) Date: Dec. 3, 2008

(87) PCT Pub. No.: WO2007/090400
PCT Pub. Date: Aug. 16, 2007

(65) Prior Publication Data
US 2009/0306828 A1    Dec. 10, 2009

(30) Foreign Application Priority Data
Feb. 10, 2006    (DK) .................. 2006 00199

(51) Int. Cl.
*G05B 13/00* (2006.01)
*G05D 23/00* (2006.01)
*F24F 11/00* (2006.01)

(52) U.S. Cl. ........... 700/276; 700/277; 700/28; 236/1 R; 236/40

(58) Field of Classification Search .................. 700/276, 700/277, 28; 236/1 R, 40; 165/200
See application file for complete search history.

(56) References Cited

U.S. PATENT DOCUMENTS

| | | | | |
|---|---|---|---|---|
| 3,559,724 A | * | 2/1971 | Wilkinson | 165/259 |
| 4,050,626 A | * | 9/1977 | Awalt, Jr. | 126/616 |
| 4,060,123 A | * | 11/1977 | Hoffman et al. | 165/11.1 |
| 4,248,051 A | * | 2/1981 | Darcy et al. | 62/115 |
| 4,266,599 A | * | 5/1981 | Saunders et al. | 165/239 |
| 4,294,404 A | * | 10/1981 | Gajjar | 236/49.3 |

(Continued)

FOREIGN PATENT DOCUMENTS

DE    4404272 A1    8/1994

(Continued)

OTHER PUBLICATIONS

International Search Report for PCT/DK2007/000059 dated Apr. 27, 2007.

(Continued)

*Primary Examiner* — Kakali Chaki
*Assistant Examiner* — Kelvin Booker
(74) *Attorney, Agent, or Firm* — McCormick, Paulding & Huber LLP

(57) ABSTRACT

The invention provides a method for controlling the climate of an environment, e.g. a house, which exchanges thermal energy with an ambient space. Energy is supplied to the environment e.g. by radiators, floor heating, electrical heating fans etc. According to the method, a numerically expressed comfort criteria, and a numerically expressed weight of importance of compliance with the comfort criterion are defined. Subsequently, a supply of a specific amount of energy is considered, and with respect to that amount, a numerical expression of a degree of compliance with the comfort criterion, and a numerical expression of costs related to the supply of that amount of energy are provided.

15 Claims, 1 Drawing Sheet

U.S. PATENT DOCUMENTS

| | | | | |
|---|---|---|---|---|
| 4,306,293 A * | 12/1981 | Marathe | 700/291 |
| 4,375,831 A * | 3/1983 | Downing, Jr. | 165/48.1 |
| 4,386,649 A * | 6/1983 | Hines et al. | 165/239 |
| 4,557,317 A * | 12/1985 | Harmon, Jr. | 165/201 |
| 4,645,908 A * | 2/1987 | Jones | 392/340 |
| 4,655,279 A * | 4/1987 | Harmon, Jr. | 165/267 |
| 4,660,759 A * | 4/1987 | Barnard et al. | 236/46 R |
| 4,685,307 A * | 8/1987 | Jones | 62/160 |
| 4,702,305 A * | 10/1987 | Beckey et al. | 165/239 |
| 4,702,413 A * | 10/1987 | Beckey et al. | 236/46 R |
| 4,706,882 A * | 11/1987 | Barnard | 236/46 R |
| 4,873,649 A | 10/1989 | Grald et al. | |
| 4,909,041 A * | 3/1990 | Jones | 62/99 |
| 4,971,136 A * | 11/1990 | Mathur et al. | 165/240 |
| 5,118,039 A * | 6/1992 | Williams, Jr. | 237/7 |
| 5,197,666 A * | 3/1993 | Wedekind | 236/46 R |
| 5,275,012 A * | 1/1994 | Dage et al. | 62/208 |
| 5,333,953 A * | 8/1994 | Kon | 374/109 |
| 5,395,042 A | 3/1995 | Riley et al. | |
| 5,462,225 A * | 10/1995 | Massara et al. | 236/47 |
| 5,467,265 A | 11/1995 | Yamada et al. | |
| 5,544,809 A * | 8/1996 | Keating et al. | 236/44 C |
| 5,568,733 A * | 10/1996 | Toyota et al. | 62/228.4 |
| 5,621,638 A * | 4/1997 | Afshari | 700/28 |
| 5,924,486 A * | 7/1999 | Ehlers et al. | 165/238 |
| 6,070,660 A * | 6/2000 | Byrnes et al. | 165/244 |
| 6,185,483 B1 * | 2/2001 | Drees | 700/295 |
| 6,216,956 B1 * | 4/2001 | Ehlers et al. | 236/47 |
| 6,574,581 B1 | 6/2003 | Bohrer et al. | |
| 6,633,823 B2 * | 10/2003 | Bartone et al. | 700/295 |
| 6,968,295 B1 * | 11/2005 | Carr | 700/286 |
| 7,079,904 B1 * | 7/2006 | Forstrom et al. | 700/28 |
| 7,130,719 B2 * | 10/2006 | Ehlers et al. | 700/276 |
| 7,216,021 B2 * | 5/2007 | Matsubara et al. | 700/295 |
| 7,274,975 B2 * | 9/2007 | Miller | 700/295 |
| 7,343,226 B2 * | 3/2008 | Ehlers et al. | 700/276 |
| 7,516,106 B2 * | 4/2009 | Ehlers et al. | 705/412 |
| 7,783,390 B2 * | 8/2010 | Miller | 700/291 |
| 7,839,275 B2 * | 11/2010 | Spalink et al. | 700/297 |
| 7,848,853 B2 * | 12/2010 | Milder et al. | 700/278 |
| 7,949,615 B2 * | 5/2011 | Ehlers et al. | 700/276 |
| 8,020,777 B2 * | 9/2011 | Kates | 700/276 |
| 2004/0011066 A1 | 1/2004 | Sugihara et al. | |
| 2005/0033707 A1 * | 2/2005 | Ehlers et al. | 705/412 |
| 2007/0043478 A1 * | 2/2007 | Ehlers et al. | 700/276 |
| 2007/0199336 A1 * | 8/2007 | Tantot | 62/157 |
| 2007/0227721 A1 * | 10/2007 | Springer et al. | 165/291 |
| 2009/0005912 A1 * | 1/2009 | Srivastava et al. | 700/276 |
| 2009/0157529 A1 * | 6/2009 | Ehlers et al. | 700/297 |

FOREIGN PATENT DOCUMENTS

| | | |
|---|---|---|
| EP | 0883050 | 12/1998 |
| FR | 2866945 A1 | 9/2005 |

OTHER PUBLICATIONS

Alcala, R., et al., "A Genetic Rule Weighting and Selection Process for Fuzzy Control of Heating, Ventilating and Air Conditioning Systems", Engineering Applications of Artifical Intelligence, vol. 18, No. 3, Apr. 2005, pp. 279-296, Pineridge Press, Swansea, GB.

Kummert, M., et al., "Optimal Heating Control in a Passive Solar Commerical Building", Solar Energy, vol. 69, Jul. 2001, pp. 103-116, Pergamon Press, Oxford, GB.

* cited by examiner

METHOD AND SYSTEM FOR CONTROLLING THE CLIMATE IN A HOUSE

CROSS REFERENCE TO RELATED APPLICATIONS

This application is entitled to the benefit of and incorporates by reference essential subject matter disclosed in International Patent Application No. PCT/DK2007/000059 filed on Feb. 8, 2007 and Danish Patent Application No. PA 2006 00199 filed Feb. 10, 2006.

INTRODUCTION

The present invention relates to a method for controlling the climate of an environment which exchanges thermal energy with an ambient space, e.g. for controlling an indoor climate of a building, for controlling a refrigerated space such as a cold store etc. The invention further relates to a system operating in accordance with the method.

BACKGROUND OF THE INVENTION

In a house, various heat sources might be installed such as electrical heaters, water based heating systems, HVAC systems etc. These heat sources are characterised by their dissimilarity in influencing the indoor climate and the costs of use. The indoor climate is defined by a huge number of variables such as an average temperature level, the temperature distribution, i.e. local variations of the temperature from the average temperature, draught, humidity, $CO_2$ level, light intensity etc. However, not all combinations of these variables are perceived as being equally comfortable.

By combining the heat transmission from a number of different heat sources, various comfort determinative variables can be influenced and controlled actively. Hence, a more comfortable indoor climate can be obtained. As an example, a heat source located under a window will be suitable for removing the cold draught caused by the cold window whereas it inconsiderably contributes to the temperature of the floor. A floor heating system, on the other hand, contributes very little to the removal of cold draught, and the time constant or inertia of the floor heating system renders floor heating completely unsuitable for compensation of a sudden climatic fluctuation. An electrically operated heating device comprising a heated surface with a ventilator for forced convection may very rapidly decrease the relative humidity by raising the temperature swiftly. In addition to the differences in the influence of the climate, different costs may be associated with the different heat sources. As an example, it is in many countries more expensive to use an electrical heater than a water based heating system (e.g. with an oil-fired boiler).

In a similar manner, various ways of cooling an environment may be combined in order to increase the comfort of the environment. As an example, the temperature of an environment can be lowered by a compressor-based cooling system. Such a system may provide a swift change in temperature even with relatively warm outdoor conditions. The temperature could be reduced by ventilation (requiring lower outdoor temperatures than indoor temperatures), and the temperature could be lowered by thermal convection e.g. with a ground heating/cooling system. Naturally, the costs of the temperature reduction and other comfort determinative variables than the temperature may be influenced by the selection of the source of cooling, e.g. the humidity, and draught.

DESCRIPTION OF THE INVENTION

It is an object of the present invention to improve the indoor climate, and in particular to facilitate an improved control over systems with various sources of thermal energy, e.g. for providing improved comfort, less temperature variations and improved economy. Accordingly, the invention provides a method wherein a comfort criterion and a weight of importance of compliance with the comfort criterion are defined in numerical terms. A supply of a specific amount of energy is considered, with respect to that amount, a numerical expression of a degree of compliance with the comfort criterion, and a numerical expression of costs related to the supply of that amount of energy is provided.

Since numerical expressions are provided for the degree of compliance with the comfort criterion, the weight of importance of compliance with the comfort criterion and for the costs of supply of the considered amount of energy, an acceptable balance between costs and comfort may be provided.

As an example, the comfort criterion may relate to the well being of persons in the environment. As an example, the comfort criterion may specify a desired maximum deviation of the average temperature from a desired temperature, a maximum deviation of a local temperature from an average temperature of the environment, e.g. a temperature in the vicinity of a window or other poorly isolated building components, a maximum or minimum relative humidity, a maximum desired draught, e.g. measured as an amount of exchange of air per time unit, a maximum content of $CO_2$ or other contaminants in the environment. The comfort criterion is expressed numerically, e.g. in terms of a max temperature deviation or humidity deviation from a desired level.

The degree of compliance is a numerical description of a distance between the desired comfort criterion and the actually achieved or achievable conditions of the environment, i.e. how well the environment complies with the desired climate. The actually achieved condition could be determined by the use of a sensor which determines the actual condition with respect to the defined climate variable, e.g. a temperature sensor which determines the actual temperature of the environment or a local area within the environment, or a humidity sensor which determines the actual relative humidity etc. The actually achievable conditions could e.g. be determined theoretically based on a model of the environment. As an example, the model could be based on knowledge about external conditions in the ambient space, such as temperature outside the environment and knowledge about release of thermal energy within the environment and knowledge about the exchange of the energy with the ambience.

The degree of compliance may typically be improved by increasing the amount of thermal energy which is supplied to the environment, e.g. for decreasing or increasing a too high or a too low temperature, respectively. Accordingly, improved comfort can be obtained by the use of additional energy. Assuming that the price for that energy, $P_{energy}$ is high, the user of the environment may be satisfied with a lower degree of compliance whereas if $P_{energy}$ is low, the user may require a high degree of compliance instead of settling with the discomfort of a too high or a too low temperature or whatever the comfort criteria specifies. To enable a numerical comparison between the costs of improving the degree of compliance and the interest of the user in effecting the expenditure, we introduce a weight of importance of compliance, in the following referred to as "a weight". The weight is significant for a discomfort of not complying with the defined comfort criterion. The weight is a numerical value which is multiplied with the degree of compliance, and it therefore allows the user to tune the method in accordance with considerations of economy and convenience.

The costs related to the supply of energy may be the direct costs related to the energy which is consumed or it may be the total costs associated with the energy, the maintenance and the depreciation of the heating or cooling system associated with the environment.

It is an object of the invention to provide the best combination between compliance with the comfort criterion and the costs of the energy. Since the degree of compliance, the weight of importance, and the costs of the supplied energy are provided numerically, the best combination may be achieved by mathematic manipulation of the numbers which identify the degree of compliance, the weight of importance, and the costs of the supplied energy. As an example, a plurality of different amounts of supplied energy may be considered by combining, for each amount, the numbers into one single number which is descriptive of the compliance with the comfort criterion versus the consumption of energy. One way of combining the numbers is to subtract a product of the degree of compliance and weight from the costs. When such a single number is provided for each of the considered amounts of supplied energy, the lowest number could be selected and the corresponding amount of energy could be supplied to the environment.

The thermal energy could be supplied by any kind of source known per se, e.g. by a radiator or a floor heating system which receive a flow of hot or cold water and exchanges the thermal energy with the environment. The source could also be heated electrically which typically reduces the time constant and thereby enhances the ability of responding to swift temperature changes. The radiator could be combined with a ventilation device for increasing thermal convection.

In a multi source embodiment of the invention, energy is supplied by a first source and a second source. At least one of the sources may be adapted to submit thermal energy faster than another source, at least one of the sources may submit thermal energy equally distributed over a larger area of the heated environment than another source, and at least one of the sources may submit the energy at lower costs than another source. In the multi source embodiment, the method may comprise the steps of: defining combinations of different amounts of energy to be submitted by each source, and providing for each combination, operating costs and a degree of compliance. Again, the energy supply and combination between the sources which provides the best combination between compliance with the comfort criterion and the costs of the energy may be selected. As mentioned above, this best amount and combination may be determined by multiplying the degree of compliance with the weight and subtracting the achieved number from the costs of the energy.

Examples of physical quantities which may influence the climate are: a temperature of the environment, a relative humidity or a concentration of other substances in the air of the environment, e.g. dust, solvents, bacteria etc in the environment, light intensity e.g. obtained by solar radiation or obtained by lamps etc., draught and asymmetric heat radiation. Accordingly, it may be desired to rate the sources of thermal energy based on their capabilities to influence those physical quantities, and to release the necessary amount of energy based on the rating. Accordingly, the comfort criterion may relate to any of these quantities, and in one embodiment, several comfort criteria are defined, the other aspects of the invention applying, mutatis mutandis.

As an example, a fixed amount of necessary energy may be released from a floor heating system since it gives an even distribution of the energy in the environment, or the energy may be released from radiators located under a window to avoid cold draught, or the energy may be released by a combination of the floor heating system and the radiators, e.g. so that the floor heating system releases sufficient energy to ensure a minimum temperature of the floor and remaining necessary energy is released by the radiators. In a similar manner, it may be expected by the users that draught of any kind is removed completely whereas asymmetric heat radiation up to a certain level is accepted.

In one embodiment, the method may comprise the step of selecting the sources based on a fixed sequence of energy sources which should be used for supplying a certain amount of energy before initialising the next energy source in the sequence until all the necessary energy is supplied. The control of the climate in the environment may comprise the following steps:

a) The necessary amount of energy is determined in order to ensure a minimum temperature of the environment,
b) the most important comfort criterion is identified,
c) the source which is best suited for the identified criterion is identified.
d) energy is supplied from the identified source until the identified criterion is complied with or until a certain degree of compliance is achieved.
e) a residual amount of energy is determined by subtracting the allocated amount of energy from the necessary amount of energy.
f) steps b, c, d and e are repeated for the second most important criterion, third most important criterion etc until the necessary amount of energy has been supplied to the environment.

In a second aspect, the invention provides a system for controlling the climate of an environment, the system comprising a supply of thermal energy and control means adapted, based on a defined comfort criteria, to define a comfort criteria and a weight of importance of compliance with the comfort criterion, consider a supply of a specific amount of energy, provide with respect to that amount, a degree of compliance with the comfort criterion and costs related to the supply of that amount of energy, and control the supply in accordance with a consideration which causes an acceptable balance between the degree of compliance, the weight of importance, and the costs. In accordance with the first aspect of the invention, the system may comprise a first and a second individually applicable thermal energy source, said processing means being adapted to: define combinations of different amounts of energy supplied by each source, provide for each combination, a degree of compliance with the comfort criterion and costs related to the supply of that amount of energy from each source, and select a combination based on a consideration which causes an acceptable balance between the degree of compliance, the weight of importance, and the costs.

The sources could be different with respect to a rate at which the sources are capable of transmitting thermal energy or with respect to a type of energy consumed by the sources for transmitting the thermal energy. Examples of sources are, floor heating, regular radiators, electrical fans, heat pumps, radiant heating devices etc. In particular, the sources may be unequally expensive in use and they may be located differently, e.g. with respect to windows, doors and other areas in which the thermal convection with the ambient space is of a particular nature.

In one embodiment, the system is adapted to determine an amount of thermal energy, $\dot{Q}_{total}$, which is necessary to compensate for the energy which is exchanged with the ambient space, and to allocate $\dot{Q}_{total}$ between the first and second source. The allocation could be based on a signal received from at least one sensor selected from the group consisting of: thermometers, incident solar radiation sensors, anemometers such as drag anemometers, any kind of sensor capable of sensing heat radiation, e.g. a sensor with a shielding which prevents direct solar radiation.

In one embodiment, the system is adapted to calculate a lowest possible heating cost necessary to comply completely with at least one comfort criterion, e.g. the least expensive way of obtaining the desired average temperature of the environment. In this embodiment, the system may further be adapted to calculate an over-expenditure which indicates either how much the actual energy consumption for a specific combination of sources is above the lowest possible heating cost.

DETAILED DESCRIPTION

Figure 1:
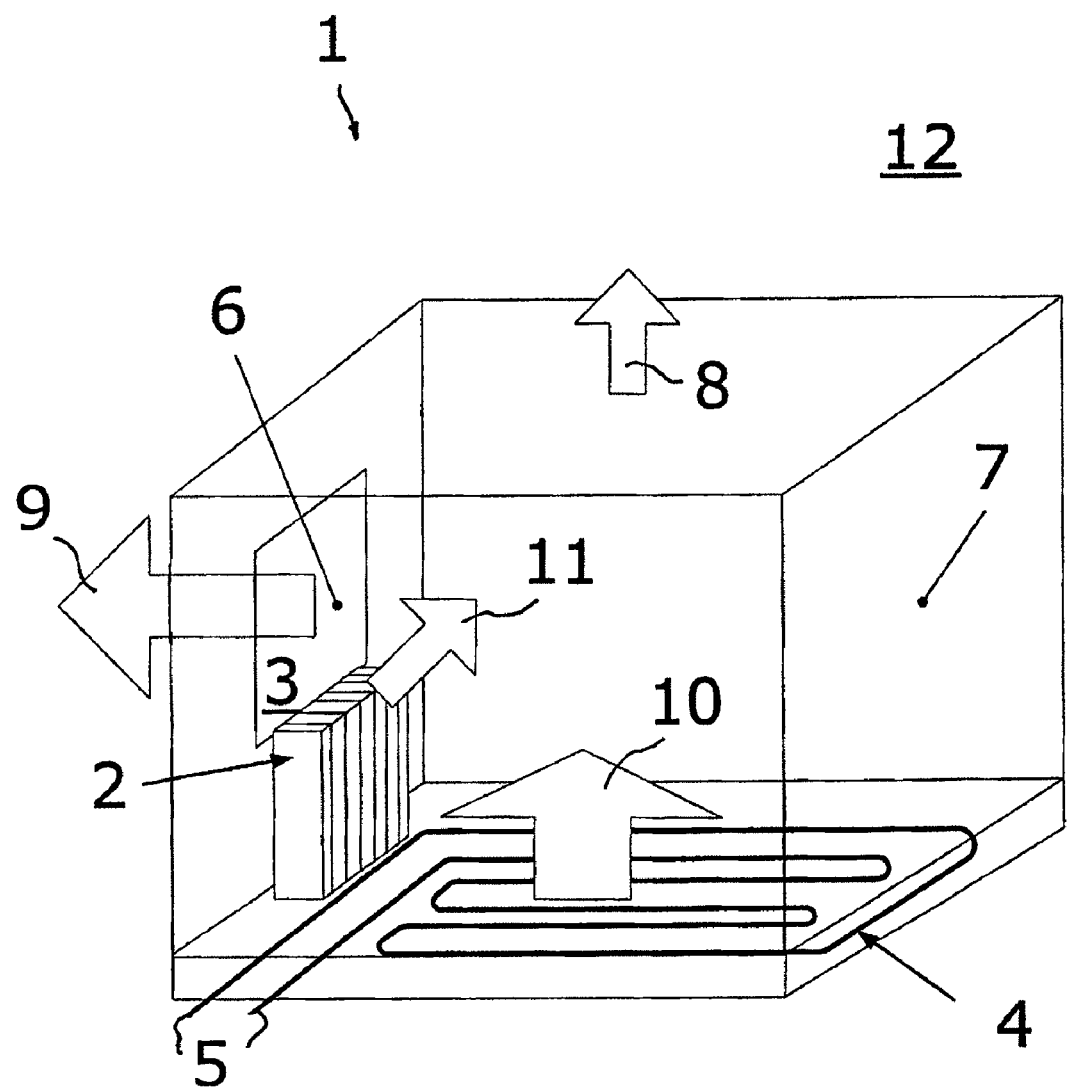
FIG. 1 is a schematic representation of a house with an electrical heater.

In the following, a preferred embodiment of the invention will be described in further details with reference to the drawing in which FIG. 1 illustrates a house 1 with an electrical heater 2 located under a window 3 and a water based floor heating system 4 with hot pipes 5 imbedded in a concrete construction which has a large thermal lag. A temperature sensor 6 is located at the window and another temperature sensor 7 is located at the wall.

We assume that the heat loss to the surroundings can be divided into two terms namely a heat loss through the ceiling $\dot{Q}_{Ambient}$ and a heat loss through the window $\dot{Q}_{Window}$. The arrow 8 illustrates $\dot{Q}_{Ambient}$, and the arrow 9 illustrates $\dot{Q}_{Window}$. The arrow 10 illustrates $\dot{Q}_{Floorheat}$ which is the heat provided by the floor heating and the arrow 11 illustrates $\dot{Q}_{Electrical}$. By $\dot{Q}_{Ambient}$ and $\dot{Q}_{Window}$, the house 1 exchanges thermal energy with the ambient space 12.

We will assume that a good comfort is obtained if we have a uniform temperature in the room (this is just one of many possible comfort parameters).

Now if we initially assume that the heat loss through the window is zero ($\dot{Q}_{Window}=0$) and that the floor heat ($\dot{Q}_{Floorheat}$) counterbalances the heat loss through the ceiling, $\dot{Q}_{Floorheat}=\dot{Q}_{Ambient}$, then at steady state a close to uniform temperature distribution in the room ($T_{Window}=T_{Wall}=T_{mean}$) will be reached. Hot air from the floor will rise up towards the ceiling and cold air will fall towards the floor, thus mixing the air ensuring a uniform temperature distribution. Turning on the electrical heat element at the window will therefore not contribute to an improved comfort.

Now if, however, there is a heat loss through the window, i.e. $\dot{Q}_{Window}>0$ and the floor heating system counterbalance the entire heat loss ($\dot{Q}_{Ambient}+\dot{Q}_{Window}$), then temperature distribution will no longer be uniform, i.e. $T_{Window}<T_{Wall}$. The mean temperature in the room (($T_{Window}+T_{Wall})/2=T_{mean}$) is, however, unchanged.

If, however, the heat transmission is divided on the two heat sources such that $\dot{Q}_{Electrical}=\dot{Q}_{Window}$ and $\dot{Q}_{Floorheat}=\dot{Q}_{Ambient}$ then a uniform temperature distribution will be re-established $T_{Window}=T_{Wall}=T_{mean}$. Turning on the electrical heater has thus improved the comfort. This improved comfort is, however, obtained by using a more expensive heat source namely the electrical heater. Assuming that the price of electricity is $P_{el}$ per kW and the price of using the water based floor heating is $P_{oil}$ per kW ($P_{el}>P_{oil}$) then the improved comfort has a cost of $\dot{Q}_{Electrical}(P_{el}-P_{oil})$. Hence if we can settle with the discomfort of having an uneven temperature distribution and perhaps furthermore a lower mean temperature then we can obviously save some money.

If we introduce a weight on the discomfort of not having the optimal mean temperature $C_{mean}$ and a weight on the discomfort of not having a uniform temperature distribution $C_{uni}$, following optimization problem can be posed:

$$\min_{\dot{Q}_{Electrical},\dot{Q}_{Floorheat}} \left( \underbrace{\frac{\|\dot{Q}_{Electrical}\|^{\{1,2,\ldots,\infty\}} P_{el} + \|\dot{Q}_{Floorheat}\|^{\{1,2,\ldots,\infty\}} P_{oil}}{\text{Price of heating}}}_{} + \underbrace{\|T_{mean} - T_{ref}\|^{\{1,2,\ldots,\infty\}} C_{mean} + \left(\frac{\|T_{mean} - T_{Window}\|^{\{1,2,\ldots,\infty\}} + \|T_{mean} - T_{Wall}\|^{\{1,2,\ldots,\infty\}}}{}\right) C_{uni}}_{\text{Discomfort}} \right) \quad \text{Equation 1}$$

subjected to:

$$T_{mean} = \frac{1}{2}(T_{Wall} + T_{Window})$$

$$T_{Window} = f_{Window}(\dot{Q}_{Electrical}, \dot{Q}_{Floorheat}, \dot{Q}_{Window}, \dot{Q}_{Ambient})$$

$$T_{Wall} = f_{Wall}(\dot{Q}_{Electrical}, \dot{Q}_{Floorheat}, \dot{Q}_{Window}, \dot{Q}_{Ambient})$$

where $T_{ref}$ is the desired mean temperature.

By choosing high values of the weights $C_{mean}$ and $C_{uni}$, the comfort is prioritized higher than the price of heating whereas small weights emphasize the importance of the price of heating. Solving the minimization problem Equation 1 gives the optimal values of $\dot{Q}_{Electrical}$ and $\dot{Q}_{Floorheat}$, such that comfort is balanced with price.

In the general case with a system consisting of n different heat sources, each transmitting the heat $\dot{Q}_i$ (i∈{1, 2, ..., n}) to the room, the following optimization problem can be posed:

$$\min_{\dot{Q}_{Electrical},\dot{Q}_{Floorheat}} \left( \underbrace{\sum_{i=1}^{n} \|\dot{Q}_i\|^{\{1,2,\ldots,\infty\}} P_i}_{\text{Price of heating}} + \underbrace{\left\| \frac{Comfort_{ref} - Comfort}{} \right\|^{\{1,2,\ldots,\infty\}} C_{comfort}}_{\text{Discomfort}} \right)$$

subjected to:

$$Comfort = f_{Comfort}(\dot{Q}_1, \ldots, \dot{Q}_n, \text{Ambient})$$

where Comfort denotes the comfort in the room, which is a function of the heat supplied by the individual heat sources and the properties of the ambient denoted Ambient. The properties of the ambient are: temperature, humidity, wind speed etc.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A method for controlling the climate of an environment which exchanges thermal energy with an ambient space, the environment being provided with a supply of thermal energy, said method comprising the steps of:

defining a numerically expressed comfort criterion and a numerically expressed weight of importance of compliance with the comfort criterion, considering a supply of a specific amount of thermal energy, and providing with respect to said specific amount of thermal energy, a numerical expression of a degree of compliance with the comfort criterion, and a numerical expression of costs related to the supply of said specific amount of thermal energy, wherein the thermal energy is supplied by a first source and a second source, said method further comprising:

defining combinations of different amounts of energy supplied by each source, providing for each combination, a numerical expression of a degree of compliance with the comfort criterion and costs related to the supply of said specific amount of thermal energy from each source, and selecting a combination based on a numerical expression of a degree of compliance with the comfort criterion, and a numerical expression of costs related to the supply of said specific amount of thermal energy.

2. The method according to claim 1, wherein the numerically expressed comfort criterion, the weight of importance of compliance with the comfort criterion, and the degree of compliance with the comfort criterion are compared with the numerically expressed costs related to the supply of that amount of energy.

3. The method according to claim 1, wherein the numerically expressed comfort criterion, the weight of importance of compliance with the comfort criterion, the degree of compliance with the comfort criterion, and the costs related to the supply of that amount of energy are combined into one single numerical identifier of compliance with the comfort criterion and consumption of energy.

4. The method according to claim 3, wherein the numerically expressed comfort criterion, the weight of importance of compliance with the comfort criterion, the degree of compliance with the comfort criterion, and the costs related to the supply of that amount of energy are combined into the single numerical identifier by subtracting a product of the degree of compliance and weight of importance of compliance with the comfort criterion from the costs.

5. The method according to claim 4, wherein the selected amount is the amount which causes the lowest numerical identifier of compliance with the comfort criterion and consumption of energy.

6. The method according to claim 3, wherein a plurality of different amounts of supplied energy are considered, and wherein the numerical identifier of compliance with the comfort criterion and consumption of energy for each considered amount of energy are compared, and wherein an amount of energy is selected based on the comparison.

7. The method according to claim 1, wherein the comfort criteria define at least one of:

a difference between an average temperature and a desired temperature of the environment, a duration during which the average temperature is different from the desired temperature, and a desired maximum temperature difference between a local area of the environment and the average temperature of the environment.

8. The method according to claim 1, wherein each source is rated based on at least one of:

its capability to reduce draught, its capability to reduce asymmetric heat radiation, its capability to modify humidity, and the rate at which it changes the temperature of the environment.

9. A system for controlling the climate of an environment, the system comprising a supply of thermal energy and control means; wherein the control means is adapted to:

define a numerically expressed comfort criterion and a numerically expressed weight of importance of compliance with the comfort criterion, consider a supply of a specific amount of thermal energy, and provide with respect to said specific amount of thermal energy, a numerical expression of a degree of compliance with the comfort criterion, and a numerical expression of costs related to the supply of said specific amount of thermal energy, wherein the thermal energy is supplied by a first source and a second source, said method further comprising:

define combinations of different amounts of energy supplied by each source, provide for each combination, a numerical expression of a degree of compliance with the comfort criterion and costs related to the supply of said specific amount of thermal energy from each source, and select a combination based on a numerical expression of a degree of compliance with the comfort criterion, and a numerical expression of costs related to the supply of said specific amount of thermal energy.

10. The system according to claim 9, wherein the sources are different with respect to a rate at which the sources are capable of transmitting thermal energy.

11. The system according to claim 9, wherein the sources are different with respect to a type of energy consumed by the sources for transmitting the thermal energy.

12. The system according to claim 9, wherein an amount of thermal energy provided by the second source is more expensive than the same amount provided by the first source.

13. The system according to claim 9, wherein the sources are different with respect to a location in the environment.

14. The system according to claim 9, adapted to determine an amount of thermal energy, $\dot{Q}_{total}$, which is necessary to compensate for the energy which is exchanged with the ambient space, and to allocate $\dot{Q}_{total}$ between the first and second source.

15. The system according to claim 14, wherein the allocation is based on a signal received from at least one sensor capable of measuring a physical quantity relevant to the defined comfort criterion.

* * * * *